VARIABLE PULSE WIDTH MONOSTABLE MULTIVIBRATOR

Filed May 9, 1966

INVENTORS
James G. Gibson
Louis J. Wunderlich
BY
Mueller, Aichele & Rauner
ATTYS.

United States Patent Office 3,517,220
Patented June 23, 1970

3,517,220

VARIABLE PULSE WIDTH MONOSTABLE MULTIVIBRATOR

James G. Gibson, Scottsdale, and Louis J. Wunderlich, Phoenix, Ariz., assignors to Motorola, Inc., Franklin Park, Ill., a corporation of Illinois Filed May 9, 1966, Ser. No. 548,687
Int. Cl. H03k *1/18, 3/284*
U.S. Cl. 307—273 8 Claims

ABSTRACT OF THE DISCLOSURE

Disclosed is a variable pulse width voltage controlled multivibrator which includes first and second transistors cross-coupled for monostable switching action, with the first transistor normally conducting and the second transistor normally nonconducting in the quiescent state of the multivibrator. A variable capacitance timing network forms part of the feedback circuit of the multivibrator and is connected between the first and second transistors. The timing network is directly connected to and continuously responds to a variable control voltage to vary the timing of the multivibrator circuit, both in response to variations of charge stored by the timing network and also in response to variations in the effective capacitance of the timing network. The timing network is also responsive to the control voltage to determine the point in the multivibrator timing cycle at which the capacitance is changed.

This invention relates generally to voltage controlled oscillators and more particularly to a monostable multivibrator having voltage responsive timing means for changing the time constant and switching time of the multivibrator.

It is often desirable in various applications such as telemetering and computers for example, to produce voltage pulses of variable width. Since the monostable switching time of a monostable multivibrator is determined by the values of resistance or capacitance in the multivibrator feedback circuit, one is often required to make the physical adjustments of certain individual circuit components within the internal circuit of the multivibrator in order to change the timing cycle thereof. In view of the obvious attendant disadvantages in the requirement for making such adjustments to individual circuit components in an oscillator, it is an object of the present invention to provide an improved monostable multivibrator, the time constant and the switching time of which may be simply and easily remotely controlled.

It is another object of the invention to provide a monostable multivibrator having a novel voltage responsive charge and discharge timing network.

It is another object of the invention to provide a new and improved monostable multivibrator, the switching time of which may be voltage controlled during the continuous monostable operation of the multivibrator.

A feature of the present invention is the provision of a variable pulse width monostable multivibrator including cross-coupled transistors interconnected by a variable capacitance feedback circuit. A source of control voltage is connectable to the multivibrator feedback circuit for changing the effective feedback capacitance in the feedback circuit and thereby changing the monostable switching time of the multivibrator.

Another feature of the invention is the provision of a novel, diode-capacitance timing network within the feedback circuit of the monostable multivibrator and connectable to the source of control voltage. This network includes a pair of diodes, the conductive states of which are controlled by the level of control voltage in order to change the amount of capacitance in the feedback circuit of the multivibrator and the time constant and monostable switching time thereof.

Figure 1:
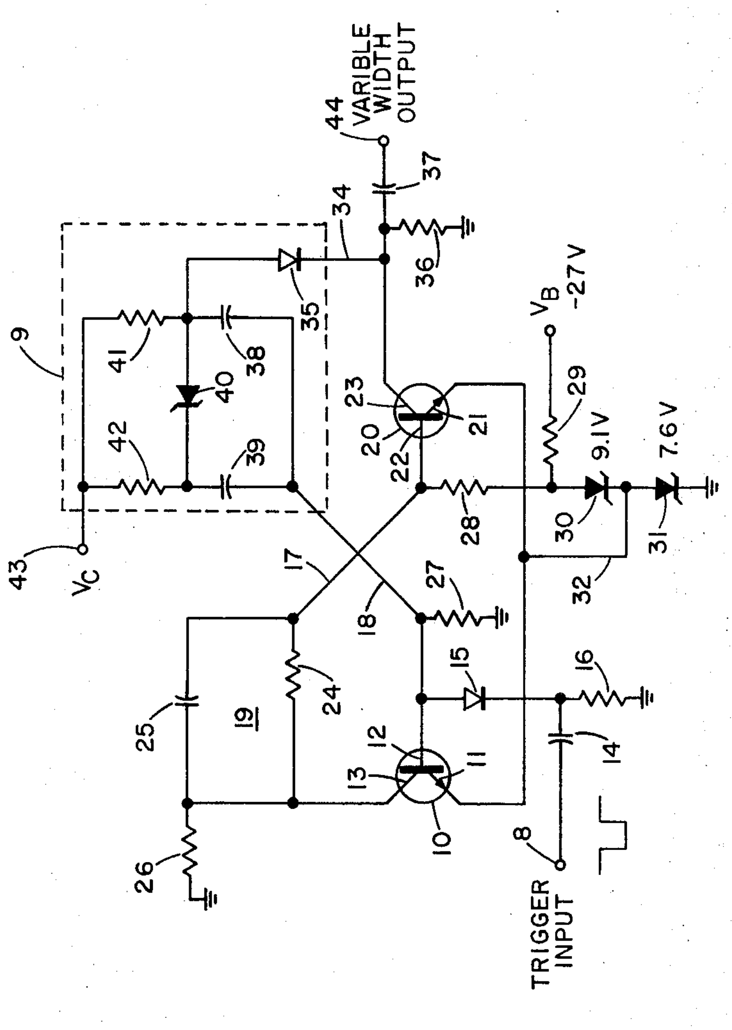
Figure 2:
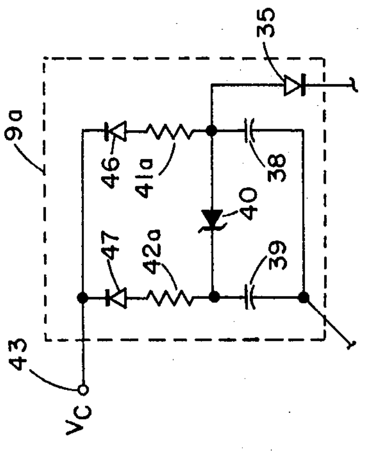

These and other objects and features of the invention will be apparent from the following detailed description of the accompanying drawing wherein:

FIG. 1 is a schematic diagram of the transistorized monostable multivibrator according to the invention, and FIG. 2 is an alternative feedback circuit which may be used to replace the existing feedback circuit in the multivibrator of FIG. 1.

Briefly described, the monostable multivibrator according to the invention includes a first transistor which is normally conducting in the quiescent state of the oscillator and a second transistor which is cross-coupled to the first transistor and which is normally non-conducting in the quiescent state of the oscillator. When a switching pulse is applied to the conducting transistor, the conducting transistor is driven to cutoff and the voltage transition produced thereby drives the normally non-conducting transistor into conduction. The length of time that the second transistor remains conducting determines the output pulse width and timing cycle of the monostable multivibrator. A timing network is connected in the feedback circuit of the multivibrator between the output of the normally non-conducting transistor and the input of the transistor which is normally conducting in the quiescent state of the oscillator. This timing network includes a pair of capacitors and a pair of diodes and is connectable to a source of control voltage. The value of control voltage applied to the timing network determines the conductivity of the pair of diodes therein, and the diode conduction in turn controls the amount of capacitance in the oscillator feedback circuit.

Referring now in detail to the drawing, there is shown a pair of NPN transistors 10 and 20, cross-coupled in a non-symmetrical circuit configuration for monostable or one shot switching action. Transistor 10, which will be referred to hereinafter as the first transistor, includes emitter, base and collector electrodes 11, 12 and 13, and the base electrode 12 is coupled via coupling capacitor 14 and diode rectifier 15 to a source of trigger pulses at input terminal 8. Transistor 10 is normally conducting in the absence of trigger pulses and is connected at the collector electrode 13 thereof via resistance-capacitance network 19 to the base electrode 22 of a second, normally non-conducting transistor 20. Transistor 20 likewise includes emitter, base and collector electrodes 21, 22 and 23 and is connected at the base electrode 22 thereof via resistors 28 and 29 to a source of negative base voltage $V_B$. Transistors 10 and 20 have base bias resistors 27 and 28 connected as shown, and the second transistor 20 is connected to a Zener diode biasing network including serially connected breakdown diodes 30 and 31. Diode 31 provides the emitter bias for transistors 10 and 20 via conductor 32. Resistors 29 provides a sustaining current to Zener diodes 30 and 31, and diode 31 maintains the emitters 11 and 21 of transistors 10 and 20, respectively, 7.6 volts above ground potential. The total voltage drop across diodes 30 and 31 with respect to ground is 16.7 volts, and this voltage is used as a reference voltage for the base of transistor 20 and applied through resistor 28. This 16.7 volts serves to hold transistor 20 in a normally non-conducting state.

Each of the transistors, 10 and 20 includes a collector load resistor referenced as 26 and 36, respectively, and the multivibrator output voltage is coupled via a capacitor 37 to a voltage output terminal 44.

The timing network 9 which is connected to a source of control voltage $V_C$ at terminal 43 will be explained in the following detailed description of the monostable switching operation of transistors 10 and 20. Assume that the multivibrator is in its quiescent state and a negative trigger pulse is applied at the base 12 of the first, normally conducting transistor 10. This negative pulse will drive transistor 10 non-conducting and will cause a positive voltage transition to be coupled through RC network 19 to the base 22 of the second, normally non-conducting transistor 20. This positive transition will turn transistor 20 on, dropping the collector 23 voltage to a negative value which is approximately equal to the +7.6 volts between Zener diodes 30 and 31.

If the control voltage $V_C$ is within a first predetermined range of negative potential extending from −6.5 volts to −10 volts, a first diode 35 will not conduct and the network 9 will be effectively disconnected from the feedback path 18 of the multivibrator. Within this first predetermined range of control voltage, the switching time of the multivibrator will be at a minimum.

If, however, the control voltage $V_C$ is moved within a second predetermined range of negative potential extending from −6.5 to −3.5 volts and a trigger pulse is applied to terminal 8 to switch the multivibrator, the negative potential applied via resistor 41 to the anode of the first diode 35 will be sufficiently high to overcome the diode offset voltage and diode 35 will conduct. With diode 35 conducting in this second predetermined range of control voltages, a first capacitor 38 is connected in the feedback path 18 of the multivibrator and the switching time of the multivibrator will be increased. The switching time of the multivibrator is dependent upon the time constant of the circuit and the magnitude of the control voltage $V_C$ applied at terminal 43. The time constant is now equal to the value of resistor 27 multiplied by the value of capacitor 38. Operating within the second predetermined range of control voltages, a second diode (Zener) 40 is non-conducting and a second capacitor 39 and resistor 42 do not affect the monostable switching time of the multivibrator.

If the control voltage $C_C$ at terminal 43 is moved within a third predetermined range of control voltages extending from −3.5 volts to 0 volts and the multivibrator is triggered, the Zener diode 40 will be sufficiently reverse biased to break down after capacitor 38 begins to discharge. When Zener diode 40 breaks down, both first and second capacitors 38 and 39 are effectively connected in parallel between the anode of diode 35 and the resistor 27, and the time constant of the circuit is now the value of resistor 27 multiplied by the values of capacitors 38 and 39. Thus, it is possible to vary the monostable switching time of the monostable multivibrator according to the invention simply by charging the control voltage $C_C$ at terminal 43. This variation in switching time is accomplished by varying the time constant of the multivibrator in accordance with the value of control voltage $V_C$. The exact switching time within each control voltage range is determined by the exact value of the control voltage $V_C$.

In order to illustrate more specifically the timing action of the multivibrator, assume that a control voltage of −4 volts is applied to terminal 43 and that capacitors 38 and 39 are charged to the difference between −7.6 volts and −4 volts or 3.6 volts. (The saturation voltages, collector to emitter and base to emitter of transistors 10 and 20 are assumed to be zero.) When the collector of transistor 20 drops to −7.6 volts, the −3.6 volts stored on capacitors 38 and 39 is now in series with the −7.6 volts on the collector 23 of transistor 20, thus producing a total voltage of −11.2 volts at the base of transistor 10. Since the emitter 11 of transistor 10 is at −7.6 volts, transistor 10 will remain non-conducting until the voltage at the base electrode 12 changes from −11.2 to −7.6 volts by the action of capacitor 38 discharging exponentially toward zero volts through resistor 27. If the Zener diode 40 is chosen to have a breakdown voltage of 4.1 volts, it will not conduct since the voltage stored on capacitor 39 is only 3.6 volts as explained above.

If the control voltage $V_C$ is now moved into the third predetermined range of voltages from −3.5 to 0 volts, both capacitors 38 and 39 will now control the timing cycle of the multivibrator. For example, if a control voltage $V_C$ of 0 volts is applied to terminal 43 and a negative trigger input is applied at input terminal 8, the base of transistor 10 will be switched to a value of −15.2 volts when transistor 20 conducts. This is true since the voltage stored on capacitors 38 and 39 (−7.6 volts) is in series with the −7.6 volts on the collector 23 of transistor 20. After transistor 20 is switched into conduction, the initial voltage on both the anode and cathode of the Zener diode 40 is at −7.6 volts (since the voltage across a capacitor cannot change instantaneously) and the Zener diode 40 is non-conducting. However, a short time after conduction is initiated in transistor 20, the capacitor 38 discharges through timing resistor 27 to a value sufficient to enable the breakdown potential across Zener diode 40 to be reached, driving Zener diode 40 into conduction in the reverse direction and thereby effectively connecting capacitor 39 in the multivibrator feedback circuit. Prior to the conduction of Zener diode 40, the voltage at its cathode will change in proportion to the voltage change at the base of transistor 10 as capacitor 38 starts its discharge, thus enabling the above-described action to take place.

Thus, the resistor 27 will discharge capacitors 38 and 39 in a sequence after the conduction of transistor 20 takes place. The addition of capacitor 39 in the feedback circuit of the multivibrator increases the monostable switching time and the duration of the output pulse at terminal 44.

After each monostable switching cycle and with transistor 10 biased conducting again, capacitors 38 and 39 each charge to a voltage of approximately −7.6 volts on one plate thereof via the normally conducting transistor 10, and they each charge to a voltage of $V_C$ on the other plate thereof through first and second charge resistors 41 and 42, respectively. If the charge resistors 41 and 42 in the circuit of FIG. 1 are several times larger in value than the discharge resistor 27, they will not affect the output pulse duration at output terminal 44 and the recovery or charge time of capacitors 38 and 39 will be much longer than the time duration of the output pulse.

However, the overall recovery time of the multivibrator in FIG. 1 can be substantially reduced if the timing circuit **9*a* shown in FIG. 2 is substituted for the timing circuit 9 shown in FIG. 1. In the circuit shown in FIG. 2, the charge resistors 41*a* and 42*a* have a relatively low value and may be omitted from the circuit entirely if the charging current is maintained at a low value or if the charging current is supplied as a pulse. First and second diodes 46 and 47 are connected respectively between the resistors 41*a* and 42*a* and the control potential $V_C$ at terminal 43. With the timing circuit 9*a* replacing the timing circuit 9 of FIG. 1, the capacitors 38 and 39 will have an extremely fast charge or recovery time, and by using a continuously varying control voltage $V_C$, the time duration of the output pulse at terminal 44 may be controlled during continuous monostable switching action of the multivibrator. The diodes 46 and 47 in the timing circuit 9*a* permit the capacitors 38 and 39 to charge through resistors 41*a* and 42*a* and prevent these resistors from having any affect on the discharge of capacitors 38 and 39 through timing resistor 27**.

Thus, using the timing circuit **9*a* in place of the timing circuit 9** in FIG. 1, the multivibrator can be operated with an extremely small recovery time during monostable switching operation.

Additional Zener diode-capacitor networks can be placed in parallel with that of the network 9 to cause any desired number of time constant changes throughout the control voltage range. Employing network 9 and additional parallel networks in this manner is very useful in obtaining pulse width (or timing) versus control voltage relationships that have a locus of points (curve) matching a desired characteristic.

We claim:

1. A variable pulse width voltage controlled oscillator including in combination:

(a) a first electron valve means normally conducting in the quiescent state of said oscillator, (b) a second electron valve means normally nonconducting in the quiescent state of said oscillator, (c) means cross-coupling said first and second electron valve means for monostable switching action, (d) input circuit means connected to said first electron valve means and connectable to a source of switching pulses for switching said first electron valve means nonconducting and thereby enabling a voltage transition to be coupled through said cross-coupling means to said second electron valve means for turning on said second electron valve means, (e) variable capacitance feedback means connected between said second electron valve means and said first electron valve means, said variable capacitance feedback means responsive to a variable control voltage to change the effective capacitance in said feedback means and thereby vary the time constant and switching time of said oscillator, (f) said variable capacitance feedback means including charge storage means connected to receive said variable control voltage at a control voltage terminal, said charge storage means responsive to a continuous variation in said control voltage for providing a continuous variation in the switching time of said oscillator, (g) said variable capacitance feedback means including conductive means connectable to a said control voltage terminal, (h) said charge storage means including capacitance means connected between said first electron valve means and said conductive means, and (i) said variable capacitance feedback means further including diode means connected to said capacitance means and to said control voltage terminal, said diode means conductively controlled by said control voltage for determining the effective capacitance in said variable capacitance feedback means and thereby determining the output pulse duration of said oscillator.

2. A variable pulse width voltage controlled oscillator including in combination:

(a) a first electron valve means normally conducting in the quiescent state of said oscillator, (b) a second electron valve means normally nonconducting in the quiescent state of said oscillator, (c) means cross-coupling said first and second electron valve means for monostable switching action, (d) input circuit means connected to said first electron valve means and connectable to a source of switching pulses for switching said first electron valve means nonconducting and thereby enabling a voltage transition to be coupled through said cross-coupling means to said second electron valve means for turning on said second electron valve means, (e) variable capacitance feedback means connected between said electron valve means and said first electron valve means, said variable capacitance feedback means responsive to a variable control voltage to change the effective capacitance in said feedback means and thereby vary the time constant and switching time of said oscillator, (f) said variable capacitance feedback means including charge storage means connected to receive said variable control voltage at a control voltage terminal, said charge storage means responsive to a continuous variation in said control voltage for providing a continuous variation in the switching time of said oscillator, (g) a first capacitor connected between said control voltage terminal and said first electron valve means, (h) a second capacitor connected between said control voltage terminal and said first electron valve means; said variable capacitance feedback means includes (i) first diode means connected between said second electron valve means and said first capacitor for effectively connecting said first capacitor in said variable capacitance feedback means of said oscillator, and (j) second diode means connected between said first and second capacitors, said second diode means operative to conduct for a predeterimned range of control voltage for effectively connecting said second capacitor in said variable capacitance feedback means during the timing cycle of said oscillator thereby increasing the capacitance in said variable capacitance feedback means and increasing the switching time of said oscillator.

3. The circuit defined in claim 2 wherein:

(a) said first diode means is biased nonconducting for a first predetermined range of control voltage to decouple said first capacitor from said second electron valve means, said first diode means biased conducting for a second predetermined range of control voltage for coupling said first capacitor to said second electron valve means and increasing the time constant of said variable capacitance feedback means, and (b) said second diode means operative to conduct at a predetermined point in the timing cycle of said oscillator and upon the application of a control voltage within a third predetermined range of control voltage for effectively connecting said second capacitor in parallel with said first capacitor to further increase the charge storage capability, the time constant and the switching time of said oscillator.

4. A transistorized monostable multivibrator including in combination:

(a) a first transistor normally conducting in the quiescent state of said multivibrator, (b) a second transistor normally nonconducting in the quiescent state of said multivibrator, (c) means cross-coupling said first and second transistors to provide monostable switching action when said first transistor is switched by trigger pulse applied thereto, (d) a timing network connected in the feedback circuit of said multivibrator between said second and first transistors and further connected to a control voltage terminal for receiving a control voltage, said timing network including charge storage means connected to said control voltage and responsive to a continuous change in control voltage to continuously vary the switching time of the multivibrator, (e) said timing network further including bias responsive means connected to said control voltage terminal and to said charge storage means for coupling and decoupling said charge storage means from said feedback circuit of said multivibrator, (f) a discharge resistor connected between the base of said first transistor and said point of reference potential, (g) said charge storage means includes a first capacitor connected between said discharge resistor and said control voltage terminal, and (h) said bias responsive means includes first diode means connected between said first capacitor and said second transistor for decoupling said first capacitor from the feedback circuit of said multivibrator when said control voltage is within a first predetermined range of control voltage, said first diode means connecting said first capacitor in the feedback circuit of said multivibrator when said second transistor is driven into conduction and when said control voltage is within a second predetermined range of control voltage.

5. The multivibrator defined in claim 4 wherein (a) said charge storage means further includes a second capacitor connected between said discharge resistor and said control voltage terminal, and (b) said bias responsive means includes second diode means connected between said first and second capacitors for connecting said first and second capacitors in parallel between said control voltage terminal and said discharge resistor when said control voltage is within a third predetermined range of control voltage.

6. The multivibrator defined in claim 5 wherein said timing network further includes:

(a) a first charge resistor connected to said first capacitor, (b) a second charge resistor connected to said second capacitor, (c) a first blocking diode connected between said first charge resistor and said control voltage terminal, and (d) a second blocking diode connected between said second charge resistor and said control voltage terminal, said first and second charge resistors having an extremely low resistance value in order to provide a fast recovery time for said first and second capacitors, said first and second blocking diodes enabling said first and second capacitors to charge through said first and second charge resistors, respectively, and said first and second blocking diodes prevent said first and second charge resistors from affecting the discharge of said first and second capacitors.

7. The multivibrator defined in claim 5 wherein said timing network further includes:

(a) a first charge resistor connected between said first capacitor and said control voltage terminal, and (b) a second charge resistor connected between said second capacitor and said control voltage terminal, said first and second charge resistors having a large resistance value relative to the value of said discharge resistor, thereby providing a relatively long recovery time for charging said first and second capacitors subsequent to monostable switching action of said multivibrator.

8. The multivibrator defined in claim 7 wherein said second diode means is a Zener diode having an anode and a cathode, said anode connected to a common junction between said first capacitor and said first charge resistor and said cathode connected to a common junction between said second capacitor and said second charge resistor, said Zener diode being reverse biased into a breakdown region thereof during conduction of said second transistor and when said control voltage is within said third predetermined range of control voltage, said Zener diode connecting said first and second capacitors in parallel and increasing the charge storage capability of said timing network.

References Cited

UNITED STATES PATENTS

| | | | |
|---|---|---|---|
| 3,201,602 | 8/1965 | Norwalt | 307—273 XR |
| 3,260,864 | 7/1966 | Nourney | 307—273 XR |
| 3,346,746 | 10/1967 | Gordon | 328—207 XR |
| 3,353,034 | 11/1967 | Betz et al. | 328—207 XR |

DONALD D. FORRER, Primary Examiner

S. D. MILLER, Assistant Examiner

U.S. Cl. X.R.

307—265, 285; 328—207